United States Patent
Korzan et al.

(10) Patent No.: US 6,276,865 B1
(45) Date of Patent: Aug. 21, 2001

(54) STEERING COLUMN SHAFT CLAMP

(75) Inventors: William E. Korzan, Dearborn Heights, MI (US); James G. DeBisschop, Morris, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/183,247

(22) Filed: Oct. 30, 1998

(51) Int. Cl.$^7$ ............................... B25G 3/20; F16B 2/14; F16B 2/18; F16B 7/04

(52) U.S. Cl. .................. 403/374.3; 403/234; 403/236; 403/258; 403/259; 403/260

(58) Field of Search ................... 403/374.3, 362, 403/234, 235, 236, 237, 230, 256, 258, 259, 260

(56) References Cited

U.S. PATENT DOCUMENTS

| | | | |
|---|---|---|---|
| 3,737,839 | * 6/1973 | Marechal | 339/272 R |
| 4,877,364 | * 10/1989 | Sorrentino | 411/337 |
| 5,588,773 | * 12/1996 | Friedrichs et al. | 403/373 |
| 5,816,734 | * 10/1998 | Wahlin | 403/362 |
| 5,950,499 | * 9/1999 | Hosoi et al. | 74/552 |
| 6,033,145 | * 3/2000 | Xu et al. | 403/256 |
| 6,074,121 | * 6/2000 | Medeiros et al. | 403/362 |

* cited by examiner

*Primary Examiner*—Lynne H. Browne
*Assistant Examiner*—John B. Walsh
(74) *Attorney, Agent, or Firm*—John C. Bigler; Robert F. Palermo

(57) ABSTRACT

A clamp for securing a torque transmitting coupling between an intermediate shaft and a drive tube in a vehicle steering column consists of a strap wrapped upon itself in a substantially circular form with its ends overlapping, the strap having a radial hole formed through the overlapping ends, and a bolt inserted through the radial hole and threadably engageable with a threaded nut within the circular form of the strap. The bolt preferably has a flared tip for trapping the bolt within the nut and for extending into and through a hole in a wall of the drive tube to engage a recess in the intermediate shaft. It also has an undercut portion above the flared tip for disengaging from threads of the nut when the flared tip is retracted into the wall of the drive tube. Until the shaft is properly positioned in the tube, the threads of the bolt and nut are prevented from engaging to tighten the clamp. The flared tip may have threads to permit easy assembly with the nut and the strap.

12 Claims, 2 Drawing Sheets

STEERING COLUMN SHAFT CLAMP

BACKGROUND OF THE INVENTION

This invention relates generally to clamping devices for connecting steering column components and more particularly to clamps for coupling an intermediate steering shaft to a drive tube.

Assembly of steering columns in vehicles is often very difficult due to limited space in which to work and the requirement for installing several parts in order to connect and hold the steering shaft and steering drive tube together. This is especially true for connecting the intermediate shaft to the steering drive tube in the cramped space between the dashboard and the firewall, in which it is difficult to see the parts and to properly manipulate them for assembly. This leads to dropped parts, improperly located and oriented parts, and unreliable connections.

The foregoing illustrates limitations known to exist in present clamps for steering column intermediate shaft assemblies. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a clamp for securing a torque transmitting coupling between an intermediate shaft and a drive tube with a hole through its wall in a vehicle steering column, the clamp comprising a strap wrapped upon itself in a substantially circular form with its ends overlapping, said strap having a radial hole formed through the overlapping ends; and a bolt inserted through said radial hole and threadably engageable with a threaded nut within the circular form of the strap, said bolt extending past said nut into the hole in the wall of the drive tube to capture the clamp on the tube and to engage with a recess on said shaft to secure the shaft within the tube, and having means for preventing said bolt from engaging with said shaft until said shaft is properly positioned within said tube.

The foregoing and other aspects will become apparent from the following detailed description of the invention when considered in conjunction with the accompanying drawings.

DETAILED DESCRIPTION

The clamp of the invention will be best explained and understood by reference to all four Figures, since the only difference shown is in the direction of view and the state of clamping. A steering assembly consists of a steering shaft 10 and a drive tube 20 secured with a clamp 100. The shaft 10 and tube 20 have complementary non-cylindrical shapes such as splines, triangles, squares, "D" s, or other drive combinations to transmit torque between them.

Figure 1:
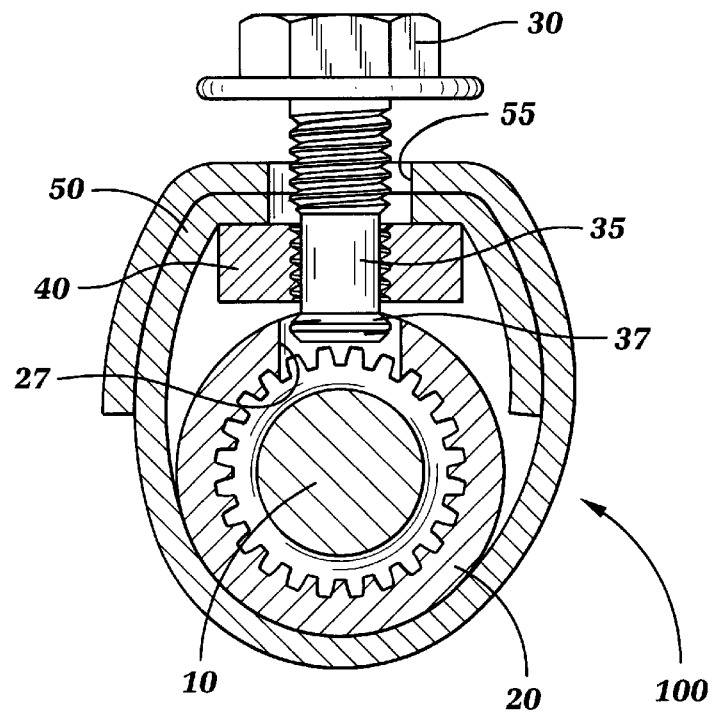
FIG. 1 is a schematic transverse partially sectional elevation view of the clamp of the invention installed on the drive tube and steering shaft in the unclamped state.
Figure 2:
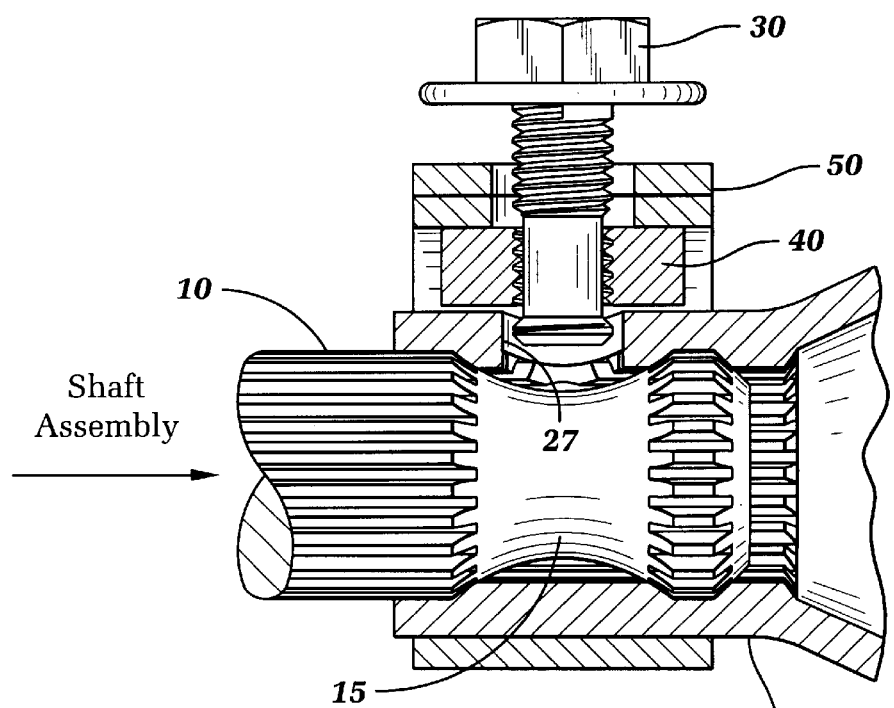
FIG. 2 is a longitudinal partially sectional view of the assembly of FIG. 1.
Figure 3:
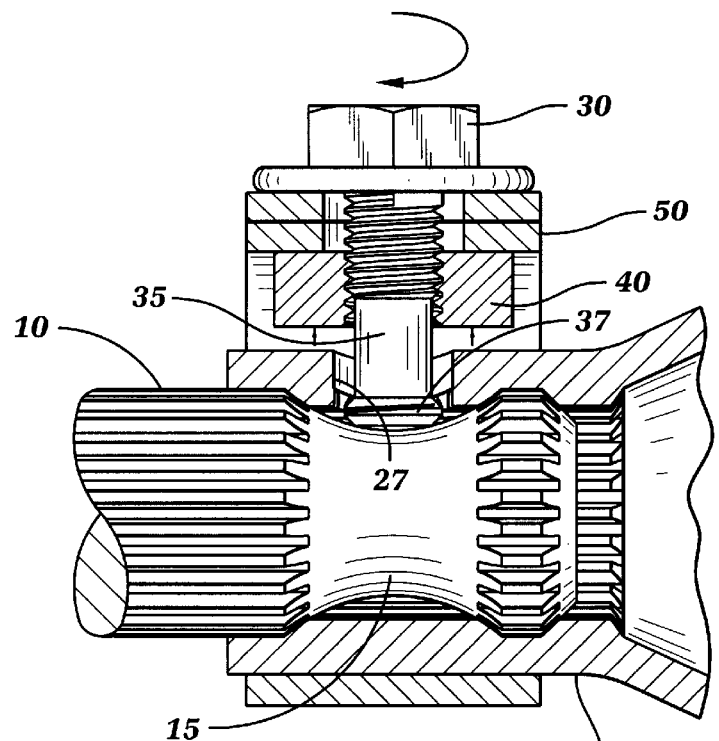
FIG. 3 is a view, similar to that shown in FIG. 2, of the assembly in the clamped state.
Figure 4:
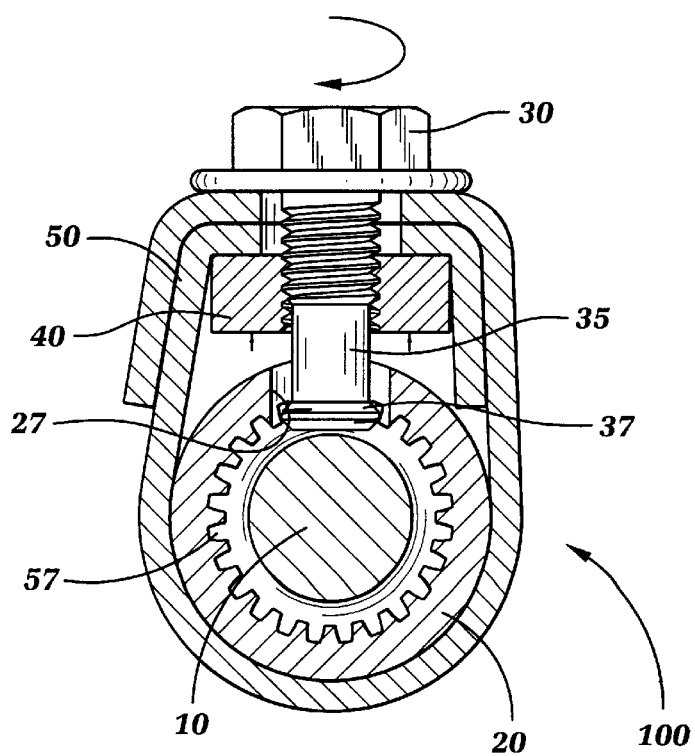
FIG. 4 is a view of the assembly, as in FIG. 1, in the clamped state.

In order to quickly and easily clamp the drive tube 20 and the shaft 10 together in the tight quarters available under the dashboard of a vehicle, a clamp 100 is provided pre-captured on the tube 20, as seen in FIGS. 1 and 2. The clamp comprises a strap 50 wrapped to overlap upon itself to form a substantially circular hoop with a radial hole 55 through the overlapping portion of the hoop. A bolt 30, with an undercut portion 35, extends radially inwardly through the hole 55 and, in the clamped state, is threadably engageable with a nut 40 within the hoop. In the unclamped state shown in FIGS. 1 and 2, the undercut portion 35 of the bolt 30 lies within the nut 40, and the flared tip 37 of the bolt lies within a hole 27 in the wall of the drive tube 20. Thus, the bolt does not contact the grooved portion 15 of the shaft 10 and is free to turn; because only the undercut (non-threaded) portion 35 of the bolt 30 is within the threads of the nut 40. The groove (or recess) 15 of the shaft 10 must be aligned with the hole 27 of the tube 20 in order to permit the bolt 30 to move radially inwardly far enough so that its threads can engage with those of the nut 40. The flared tip 37 of the bolt 30 then engages with the surface of the groove 15 to clamp the assembly together when the shaft 10 is properly positioned in the tube 20. When the bolt is tightened, the sides of the strap 50 stretch to a substantially straight condition as seen in FIG. 4. This is only an elastic straightening which maintains the bolt under a compressive load for as long as the bolt threads engage with those of the nut, and upon release of the clamping force of the bolt 30, the strap returns to the condition seen in FIG. 1.

If the shaft 10 is inserted into the tube 20 to an incorrect position, the flared tip 37 of the bolt 30 will contact the shaft at a non-grooved part. This will prevent the threaded portion of the bolt 30 from engaging the threads of the nut 40 by simply preventing the bolt from moving radially inwardly to the engaged position. The clamp, thus, provides a fool-proof locating mechanism for the shaft by preventing clamping when the shaft and tube are not engaged to the proper depth.

The flared tip 37 of the bolt captures the bolt within the nut 40 so that it is not inadvertently removable from the nut. The flare may be formed on the tip of the bolt after it is inserted through the nut 40, but it is preferably preformed and threaded so it can be threaded through the nut to its captured position during assembly.

The preferred assembly sequence is to insert the bolt 30 through the hole 55 in the wrapped strap and to thread the flared tip 37 of the bolt 30 into the nut 40 to hold the bolt, the nut, and the strap together as a clamp assembly 100. The assembly is then slid onto the tube 20 and the flared tip 37 of the bolt 30 aligned with the hole 27 in the wall of the tube 20. The bolt 30 is then turned sufficiently to allow the flared tip to release from the nut and to lie within the hole 27 in the tube wall. At this position, the undercut portion 35 of the bolt 30 is within the nut 40, the clamp assembly 100 is captured on the tube 30, and the nut 40 surrounds the undercut portion 35 of the bolt 30.

The shaft 10 is inserted in the tube 20 until the groove 15 of the shaft aligns with the hole 27 in the wall of the tube, the bolt 30 is pushed radially inwardly and turned to threadably engage with the nut 40 and to be driven inwardly to clamp against the groove 15 in the surface of the shaft 10. Note that if the flared tip 37 is formed on the bolt 30 after it is inserted through the nut 40, the wrapped strap 50 is squeezed laterally during assembly to lift the flared tip 37 sufficiently to pass over the tube 20 to be positioned in the hole 27.

In FIG. 4, the shaft 10 and tube 20 are shown as being cylindrical members with longitudinal splines 57 for torque transmission between them. This is only done for convenience since any surface form may be used so long as there is some provision for preventing relative rotational motion between the tube and the shaft. For example, a circular hole or depression in the shaft could be engaged by the flared tip of the bolt to prevent relative motion in any direction. Of course, it is preferred to use a non-cylindrical form for torque transmission together with a transverse groove or slot for axial positioning, since the highest stress for the assembly is generated in torsion.

Having described the invention, we claim:

1. A clamp for securing an intermediate shaft, with a recess on its surface, within a drive tube, with a hole through its wall, for a torque transmitting coupling in a vehicle steering column, said clamp comprising;

a strap wrapped upon itself in a substantially circular form with its ends overlapping, said strap having a radial hole formed through the overlapping ends; and a threaded bolt inserted through said radial hole and threadably engageable with a threaded nut within the circular form of said strap, said bolt for threadably advancing past said nut into the hole in the wall of the tube to capture the clamp on the tube and for threadably advancing into the recess on said shaft to secure said shaft within said tube; and means for preventing said bolt from threadably advancing beyond the wall of the tube until the recess of said shaft is aligned radially with the hole in the wall of said tube.

2. The clamp of claim 1, further comprising:

a flared tip on said bolt for capturing said bolt within said nut and for engaging the recess on said shaft.

3. The clamp of claim 2, wherein the means for preventing said clamp from threadably advancing beyond the wall of the tube until the recess of said shaft is aligned radially with the hole in the wall of said tube comprises a non-threaded portion of said bolt between a threaded portion and said flared tip, such that, after threaded advancement of the bolt into the hole of said tube, said non-threaded portion lies within said nut until the flared tip of the bolt is extended past the wall of the tube, extension of said flared tip past said wall being prevented by the surface of said shaft until the recess on the shaft is aligned with the hole in the wall of the tube.

4. The clamp of claim 3, further comprising:

threads on the flared tip to permit threading said flared tip through said nut.

5. The clamp of claim 1, wherein the recess on the intermediate shaft extends completely around its lateral surface.

6. The clamp of claim 1, wherein portions, extending between the nut and the tube, of the substantially circular form of said strap, elastically straighten when the bolt is engaged with the recess on the shaft and tightened in the nut.

7. A torque transmitting coupling for use in a vehicle steering column, said coupling comprising;

a drive tube having a wall with a hole;

a strap wrapped upon itself in a substantially circular form with its ends overlapping, said strap having a radial hole formed through the overlapping ends;

a threaded nut within the circular form of the strap; and a bolt inserted through said radial hole of the strap and extending through the threaded nut and the hole in the wall of said drive tube, thereby retaining the strap on the drive tube, for threaded advancement into a recess in an intermediate shaft, the bolt having an undercut portion above the bolt's tip for disengaging from threads of said nut when said tip is retracted into the wall of the drive tube.

8. The coupling of claim 7, wherein the tip of the bolt is flared for capturing the bolt within the nut and for engaging the recess on the shaft.

9. The coupling of claim 8, further comprising:

threads on said flared tip for assembly and disassembly of the bolt and the threaded nut with said strap.

10. The coupling of claim 7, wherein said strap, threaded nut and bolt comprise a clamp that is captured on said drive tube prior to insertion of said intermediate shaft into said drive tube.

11. The coupling of claim 7, wherein said intermediate shaft has a cylindrical shape with splines for transmitting torque.

12. The coupling of claim 10, wherein the circular form of said strap is capable of being compressed transversely to a degree sufficient for the flared tip of said bolt to pass over the drive tube to be aligned with the hole in the drive tube wall for installation of the clamp on the tube.

* * * * *